United States Patent
Nakamura et al.

(10) Patent No.: US 8,130,416 B2
(45) Date of Patent: Mar. 6, 2012

(54) IMAGE FORMING APPARATUS, IMAGE FORMING METHOD, COMPUTER PROGRAM, AND RECORDING MEDIUM

(75) Inventors: Takashi Nakamura, Yokohama (JP); Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/841,834

(22) Filed: Jul. 22, 2010

(65) Prior Publication Data

US 2010/0284031 A1 Nov. 11, 2010

Related U.S. Application Data

(63) Continuation of application No. 11/845,480, filed on Aug. 27, 2007, now Pat. No. 7,773,260.

(30) Foreign Application Priority Data

Aug. 31, 2006 (JP) ................................. 2006-235939

(51) Int. Cl.
*H04N 1/40* (2006.01)
*G03F 3/08* (2006.01)

(52) U.S. Cl. .......................... 358/3.23; 358/1.9; 358/518

(58) Field of Classification Search ................... 358/1.1, 358/1.9, 3.01, 3.1, 3.21, 1.13, 501, 518, 521, 358/3.23, 523; 382/162, 167; 347/43
See application file for complete search history.

(56) References Cited

U.S. PATENT DOCUMENTS

| 6,336,705 B1* | 1/2002 | Torigoe ........................... 347/43 |
| 7,320,510 B2* | 1/2008 | Nakamura et al. ............... 347/15 |
| 2005/0168495 A1* | 8/2005 | Nakatani et al. .............. 345/690 |
| 2006/0082833 A1 | 4/2006 | Shoda et al. |

FOREIGN PATENT DOCUMENTS

| EP | 1107176 A1 | 6/2001 |
| EP | 1560419 A2 | 8/2005 |

* cited by examiner

*Primary Examiner* — Thomas D Lee
(74) *Attorney, Agent, or Firm* — Canon U.S.A. Inc., I.P. Division

(57) ABSTRACT

An image processing method is applied for recording an image on a recording medium using a plurality of color materials including a chromatic material and an achromatic material. A total amount of recording of the chromatic material is smaller than a total amount of recording of the achromatic material, and a plurality of monochrome modes including a first monochrome mode and a second monochrome mode are provided, the total amount of recording of the chromatic material being different for each of the monochrome modes. The image processing method includes adjusting the amount of recording of the achromatic material so that a recording density of an image recorded in the first monochrome mode and a recording density of an image recorded in the second monochrome mode become equivalent to each other with respect to the same luminance signal.

7 Claims, 8 Drawing Sheets

IMAGE FORMING APPARATUS, IMAGE FORMING METHOD, COMPUTER PROGRAM, AND RECORDING MEDIUM

CROSS REFERENCE OF RELATED APPLICATIONS

This application is a continuation of U.S. patent application Ser. No. 11/845,480 filed Aug. 27, 2007 which claims the benefit of Japanese Application No. 2006-235939 filed Aug. 31, 2006, both of which are hereby incorporated by reference herein in their entirety.

BACKGROUND OF THE INVENTION

1. Field of the Invention

The present invention relates to an image forming apparatus, an image forming method, a computer program, and a recording medium. For example, the present invention relates to an image processing operation for adjusting the color tone of a monochrome image.

2. Description of the Related Art

An inkjet recording apparatus that uses a plurality of inks having different colors is known as an example of a recording apparatus capable of outputting a color image. The inkjet recording apparatus forms an image by a subtractive color mixing method and generally uses three basic colors consisting of cyan (hereinafter abbreviated as 'C'), magenta (hereinafter abbreviated as 'M'), and yellow (hereinafter abbreviated as 'Y'). Use of this combination of colors allows representation of not only hues of C, M, and Y but also various other hues. For example, red (hereinafter abbreviated as 'R') can be represented by mixing M and Y. By gradually changing the proportions of the inks mixed together, colors over an entire color space can be substantially represented.

Recently, inkjet recording apparatuses have not only achieved a color image quality equivalent to that of film photography but also provided applications in the field of monochrome photography.

In the field of monochrome photography, the required color accuracy is extremely higher than that in the field of color photography. This is because human vision is sensitive to achromatic colors, and therefore even a slight color change caused by the brightness of a printed image (hereinafter called "color transition") will be noticeable to a viewer. In order to solve this problem, a method for preventing the color transition has been suggested. According to this method, achromatic colors, such as black (hereinafter abbreviated as 'K') and gray (hereinafter abbreviated as 'Gr'), are used more dominantly than inks of chromatic colors (see, for example, Japanese Patent Laid-Open No. 2005-238835).

Japanese Patent Laid-Open No. 2006-86708, for example, discusses another method for solving the above-described problem. According to this method, a maximum usage of chromatic inks is set in advance and an amount of ink ejected onto a recording medium relative to a change in a luminance signal is reduced, so that the color adjusting accuracy can be increased.

On the other hand, recently, grayscale printing has been increasingly attracting the users' attention. Accordingly, recording apparatuses capable of performing grayscale printing with different color tones have been suggested. Here, grayscale printing is equivalent to monochrome-mode printing. In grayscale printing, amounts of color inks used together with achromatic inks, such as black ink, are suitably adjusted so that a color tone is slightly changed from that of a normal grayscale (hereinafter called a "neutral tone"). For example, a gray color tone having warm colors, such as red, orange, and yellow, mixed therein (hereinafter called a "warm tone") and a gray color tone having cold, inorganic colors, such as blue, mixed therein (hereinafter called "cool tone") can be provided. The addition of small amounts of chromatic inks for tone adjustment to the achromatic inks that are dominantly used provides a color reproduction range that covers the warm tone and the cool tone.

Japanese Patent Laid-Open No. 2004-142423 also discusses a technique for performing monochrome-mode printing with different color tones. According to this technique, with reference to the combination of inks and amounts of recording thereof for obtaining the neutral tone, the amounts of recording of the chromatic inks are changed while the amounts of recording of the achromatic inks are maintained constant.

Recently, the required image quality of inkjet printers has been continuously increased. In particular, in monochrome mode, there have been demands for eliminating the color tone difference caused by "color transition". In addition, with respect to density variation, a gradation performance higher than that in the color mode has been demanded. In the technique according to Japanese Patent Laid-Open No. 2004-142423, the amounts of recording of the chromatic inks are changed while the amounts of recording of the achromatic inks are maintained constant. Therefore, if an image corresponding to a certain luminance signal is printed in a plurality of monochrome modes corresponding to different color tones, such as the warm tone and the cool tone, the printed images have different densities depending on the monochrome modes even when the images are printed on the same kind of recording media.

As an example, a case will be considered in which an image is printed in a plurality of monochrome modes corresponding to the neutral tone, the cool tone, and the warm tone on the same kind of recording media. In this specification, a CIE-L*a*b* color space, which is commonly known, is used as the scale of color.

First, a process of representing the cool tone on a certain recording medium (hereinafter called a "recording medium A") will be described below. In this process, according to the technique of Japanese Patent Laid-Open No. 2004-142423, the cool tone is represented by changing the amounts of recording of the chromatic inks of C, M, and Y relative to those in the neutral tone without changing the amounts of recording of the achromatic inks. In more detail, the color is changed by increasing the amount of recording of the C ink. As a result, the total amount of recording of the chromatic inks is increased from that in the neutral tone. Due to the above-described process, the value of b* in the CIE-L*a*b* color space of the cool tone becomes smaller than the value of b* in the CIE-L*a*b* color space of the neutral tone.

However, in the above-described method for representing the cool tone, the density is changed from that of the image in the neutral tone by the amount corresponding to the increase in the amount of C ink. Thus, the density of the image recorded on the recording medium differs from that of the image in the neutral tone.

Next, a process of representing the warm tone on the recording medium A will be described below. Also in this process, according to the technique of Japanese Patent Laid-Open No. 2004-142423, the warm tone is represented by changing the amounts of recording of the chromatic inks of C, M, and Y relative to those in the neutral tone without changing the amounts of recording of the achromatic inks. In more detail, the color is changed by increasing the amount of recording of the Y ink and reducing the amount of recording of the C ink. Due to the above-described process, the value of b* in the CIE-L*a*b* color space of the warm tone becomes larger than the value of b* in the CIE-L*a*b* color space of the neutral tone.

However, in the above-described method for representing the warm tone, the proportions of the chromatic inks are changed from those in the neutral tone, and the density of the image formed on the recording medium differs from that of the image in neutral tone. Thus, even when the images are formed on the same recording medium, the density differs between the neutral tone and the warm tone and between the warm tone and the cool tone. This can cause discomfort to the user.

On the other hand, when an image is printed on a recording medium A and a recording medium B having different colors (paper whites) in a certain monochrome mode, the recording density differs between the images recorded on the recording media A and B.

A case in which this problem becomes more significant will be described below.

Recently, inkjet printers have become capable of printing on various types of recording media to satisfy user's needs. The various types of recording media have different printing characteristics. The most important characteristic in monochrome-mode printing is the white of the recording medium itself, that is, the color represented when no ink is ejected onto the recording medium (hereinafter called "paper white").

The reason why the paper white is important will be described below.

In inkjet printers, ink adheres to the recording medium in units of dots. Therefore, the grayscale is expressed by the density of the dots. A high-density area is obtained by recording a large number of dots per unit area, and a low-density area is obtained by recording a small number of dots per unit area, as is commonly known. Therefore, the color of the low-density region, in which the number of dots per unit area is relatively small, is largely influenced by the paper white, that is, the color of the regions where no dots are recorded.

An example is considered in which the paper white of the recording medium A is more yellow than that of another recording medium (hereinafter referred to as a "recording medium B"). The state in which "the recording medium A is more yellow than the recording medium B" is equivalent to the state in which the value of b* of the paper white of the recording medium A in the CIE-L*a*b* color space is more than the value of b* of the paper white of the recording medium A in the CIE-L*a*b* color space.

As described above, the influence of the paper white is large in the low-density area where the number of dots is small. Therefore, when the same amount of ink is ejected onto the recording medium A and the recording medium B, the recording medium A appears more yellow in the low-density areas. The appearance of the recording medium A can be made closer to that of the recording medium B by increasing the amounts of recording of C and M in the low-density areas of the recording medium A compared to those of the recording medium B. In this manner, the difference in the paper white can be compensated for.

The case in which the cool tone is represented on the recording medium A after the neutral tone is represented in the above-described manner will be described below. In this case, the amounts of recording of the chromatic inks (C and M in this case) must be further increased. As a result, the recording density is changed from that of the neutral tone, and the above-described problem that the density differs between the neutral tone and the cool tone and between the warm tone and the cool tone due to the variation in the amounts of recording of the chromatic inks becomes more significant. For example, a tone difference that can be represented in the warm tone cannot be represented in the cool tone. This causes discomfort to the viewer.

In addition, when a cool tone image is formed on two different kinds of recording media, the density of the cool tone image on one of the recording media can be different from that of the cool tone image on the other recording medium. As a result, there is a risk that a tone difference that can be represented on the recording medium B cannot be represented on the recording medium A, which also causes discomfort to the viewer.

With respect to the above-described problems, Japanese Patent Laid-Open No. 2004-142423 does not provide measures for adjusting the density difference between images formed on the same kind of recording media in different monochrome modes or between images formed on recording media with different paper whites in the same monochrome mode.

SUMMARY OF THE INVENTION

The present invention provides a structure that can solve the above-described problems by recording images with the same recording density or the same recording brightness in both a first monochrome mode and a second monochrome mode for representing different color tones.

According to an aspect of the present invention, an image processing method is applied for recording an image on a recording medium using a plurality of color materials including a chromatic material and an achromatic material. A total amount of recording of the chromatic material is smaller than a total amount of recording of the achromatic material, and a plurality of monochrome modes including a first monochrome mode and a second monochrome mode are provided, the total amount of recording of the chromatic material being different for each of the monochrome modes. The image processing method includes performing a comparison between a recording density of an image recorded on the recording medium in the first monochrome mode and a recording density of an image recorded on the recording medium in the second monochrome mode; and adjusting the amount of recording of the achromatic material on the basis of the result of the comparison so that the recording density of the image recorded in the first monochrome mode and the recording density of the image recorded in the second monochrome mode become equivalent to each other with respect to the same luminance signal.

According to another aspect of the present invention, an image processing method is applied for recording an image on a recording medium using a plurality of color materials including a chromatic material and an achromatic material. A total amount of recording of the chromatic material is smaller than a total amount of recording of the achromatic material, and a plurality of monochrome modes including a first monochrome mode and a second monochrome mode are provided, the total amount of recording of the chromatic material being different for each of the monochrome modes. The image processing method includes performing a comparison between a recording brightness of an image recorded on the recording medium in the first monochrome mode and a recording brightness of an image recorded on the recording medium in the second monochrome mode; and adjusting the amount of recording of the achromatic material on the basis of the result of the comparison so that the recording brightness of the image recorded in the first monochrome mode and the recording brightness of the image recorded in the second monochrome mode become equivalent to each other with respect to the same luminance signal.

According to another aspect of the present invention, an image processing method is applied for recording images on a plurality of recording media using a plurality of color materials including a chromatic material and an achromatic material, the recording media having different colors and including a first recording medium and a second recording medium. The image processing includes performing a comparison between a recording density of an image recorded on the first recording medium and a recording density of an image recorded on the second recording medium, the images being recorded in a monochrome mode in which a total amount of recording of the chromatic material is smaller than a total amount of recording of the achromatic material; and adjusting the amount of recording of the achromatic material on the basis of the result of the comparison so that the recording density of the image recorded on the first recording medium and the recording density of the image recorded on the second recording medium become equivalent to each other with respect to the same luminance signal.

According to another aspect of the present invention, an image processing method is applied for recording images on a plurality of recording media using a plurality of color materials including a chromatic material and an achromatic material, the recording media having different colors and including a first recording medium and a second recording medium. The image processing method includes performing a comparison between a recording brightness of an image recorded on the first recording medium and a recording brightness of an image recorded on the second recording medium, the images being recorded in a monochrome mode in which a total amount of recording of the chromatic material is smaller than a total amount of recording of the achromatic material; and adjusting the amount of recording of the achromatic material on the basis of the result of the comparison so that the recording brightness of the image recorded on the first recording medium and the recording brightness of the image recorded on the second recording medium become equivalent to each other with respect to the same luminance signal.

According to another aspect of the present invention, an image processing method is applied for recording an image on a recording medium using a plurality of color materials including a chromatic material and an achromatic material. A total amount of recording of the chromatic material is smaller than a total amount of recording of the achromatic material, and a plurality of monochrome modes including a first monochrome mode and a second monochrome mode are provided, the total amount of recording of the chromatic material being different for each of the monochrome modes. The image processing method includes adjusting the amount of recording of the achromatic material so that a recording density of an image recorded in the first monochrome mode and a recording density of an image recorded in the second monochrome mode become equivalent to each other with respect to the same luminance signal.

According to another aspect of the present invention, an image processing method is applied for recording images on a plurality of recording media using a plurality of color materials including a chromatic material and an achromatic material, the recording media having different colors and including a first recording medium and a second recording medium. The image processing method includes adjusting the amount of recording of the achromatic material so that a recording density of an image recorded on the first recording medium and a recording density of an image recorded on the second recording medium become equivalent to each other with respect to the same luminance signal.

According to the present invention, images can be recoded with the same recording density or the same recording brightness in both a first monochrome mode and a second monochrome mode for representing different color tones. In addition, images can be recoded with the same recording density or the same brightness on a plurality of recording media having different paper whites.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Referring to the accompanying drawings, an image processing operation according to embodiments of the present invention will be described below.

First Embodiment

Figure 1:
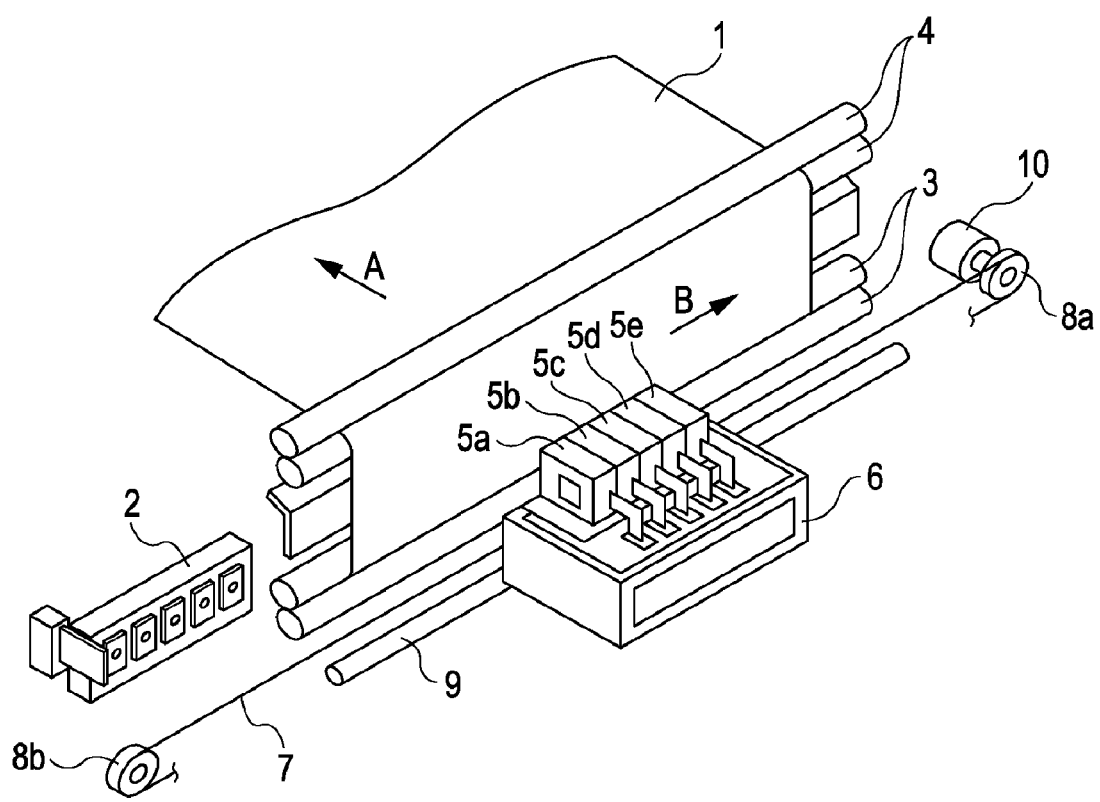
FIG. 1 illustrates the internal structure of an inkjet recording apparatus according to an embodiment of the present invention.

FIG. 1 illustrates the internal structure of an inkjet recording apparatus according to a first embodiment of the present invention. A recording medium 1 is a piece of paper or a plastic sheet. Before a recording operation is started, a plurality of recording media are stacked on a cassette (not shown) or the like. When the recording operation is started, the recording media are fed one by one to a main body of the recording apparatus by a paper feed roller (not shown). A first transport roller pair 3 and a second transport roller pair 4 are disposed with a gap therebetween, as shown in FIG. 1. The first transport roller pair 3 and the second transport roller pair 4 are driven by respective stepping motors (not shown) so that the recording medium 1 pinched by the roller pairs is transported in a direction denoted by an arrow A.

Figure 2:
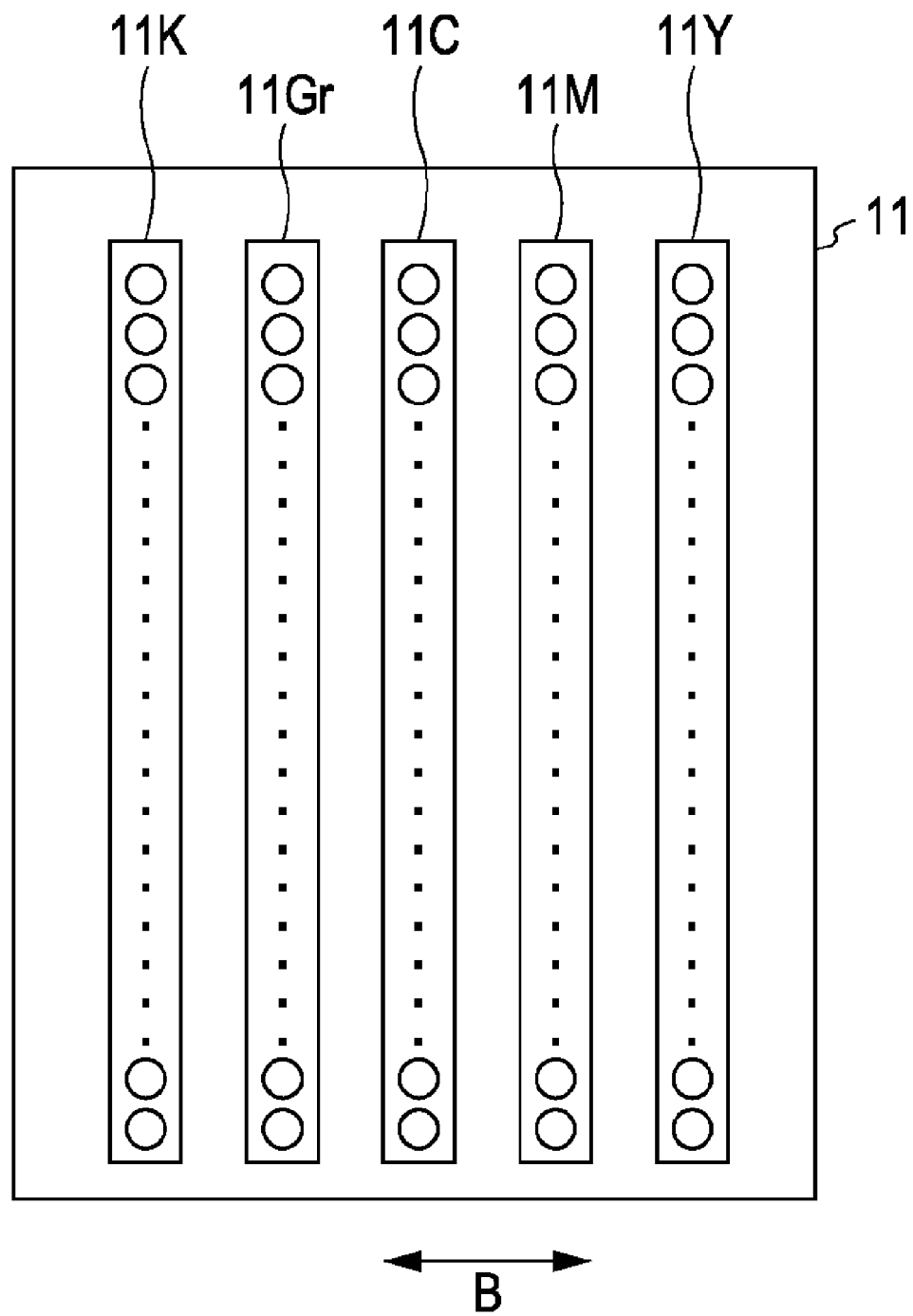
FIG. 2 is a schematic diagram illustrating the manner in which ejection holes are arranged.

Ink tanks 5a to 5e are provided for supplying ink to an inkjet recording head 11 (see FIG. 2). The ink tank 5a stores black (hereinafter abbreviated as K) ink, the ink tank 5b stores gray (hereinafter abbreviated as Gr) ink, the ink tank 5c stores C ink, the ink tank 5d stores M ink, and the ink tank 5e stores Y ink. The recording head 11 is disposed such that an ink-ejection surface from which the ink is ejected faces the recording medium 1 held in a tensioned fashion between the first transport roller pair 3 and the second transport pair 4. Parts of the recording head 11 for ejecting five color inks can be formed separately or integrally with each other.

The recording head 11 and the ink tanks 5a, 5b, 5c, 5d, and 5e are removably mounted on a carriage 6. A carriage motor 10 reciprocates the carriage 6 in a direction denoted by an arrow B and a direction opposite thereto using two pulleys 8a and 8b and a belt 7. The scanning direction of the carriage 6 is determined by a guide shaft 9.

A recovery unit 2 performs maintenance of the recording head 11. The recording head 11 is moved to a home position at which the recovery unit 2 is disposed as necessary. At the home position, the recovery unit 2 performs a recovery process of, for example, removing ink clogging in the ejection holes of the recording head 11.

In the recording operation, the carriage 6 is moved at a predetermined speed in the direction denoted by the arrow B. At the same time, ink droplets are ejected with proper timing from the recording head 11 in accordance with an image signal. Each time the recording head 11 finishes a single scanning cycle, the transport roller pairs 3 and 4 transport the recording medium 1 by a predetermined distance. The above-described recording/scanning step and the transporting step are alternately performed, so that an image is gradually formed on the recording medium 1.

FIG. 2 is a schematic diagram illustrating the manner in which ejection holes are arranged in the recording head 11. As shown in FIG. 2, ejection-hole lines 11K, 11Gr, 11C, 11M, and 11Y for the respective color inks are arranged in the same order as the order in which the ink tanks 5a, 5b, 5c, 5d, and 5e are arranged in the carriage-scanning direction denoted by the arrow B. In each line, 512 holes are arranged at intervals of about 40 μm in the recording-medium-transporting direction denoted by the arrow A. Accordingly, each time the recording head 11 performs the recording/scanning step once, an image with a resolution of 600 dpi (dots per inch; reference value) is formed on the recording medium 1.

In the present embodiment, it is assumed that an ink droplet of about 3 ng is ejected from each ejection hole.

In the present embodiment, the Gr ink and the K ink are the achromatic inks that are dominantly used, and the C ink, the M ink, and the Y ink are used for correcting the color transition (hereinafter referred to as "tone adjustment").

Figure 3:
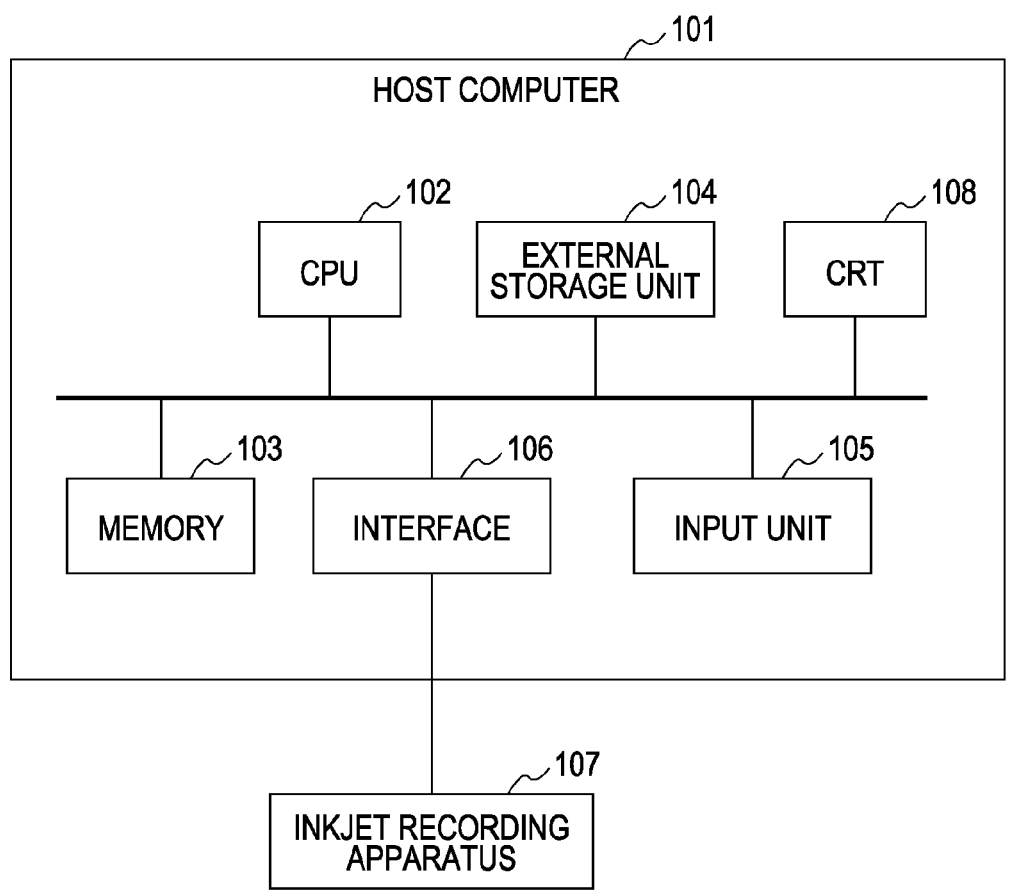
FIG. 3 is a block diagram illustrating an image processing system according to an embodiment of the present invention.

FIG. 3 is a block diagram illustrating an image processing system according to the present embodiment. A host computer 101 includes a CPU 102, a memory 103, an external storage unit 104, an input unit 105, a CRT 108, and an interface 106.

The CPU 102 performs various image data conversion processes, which will be described below, and processes related to recording by executing programs stored in the external storage unit 104. The memory 103 is used as a work area for the conversion processes and as a temporary storage area for the image data. The programs for the image data conversion processes and the like can be supplied to the host computer 101 from an external apparatus (not shown). A user inputs various commands via the input unit 105 while checking the CRT 108.

The host computer 101 is connected to an inkjet recording apparatus 107 via the interface 106. The image data is subjected to the conversion processes, and is then transmitted to the inkjet recording apparatus 107 by the CPU 102. Then, the inkjet recording apparatus 107 performs the recording operation on the basis of the received image data.

Figure 4:
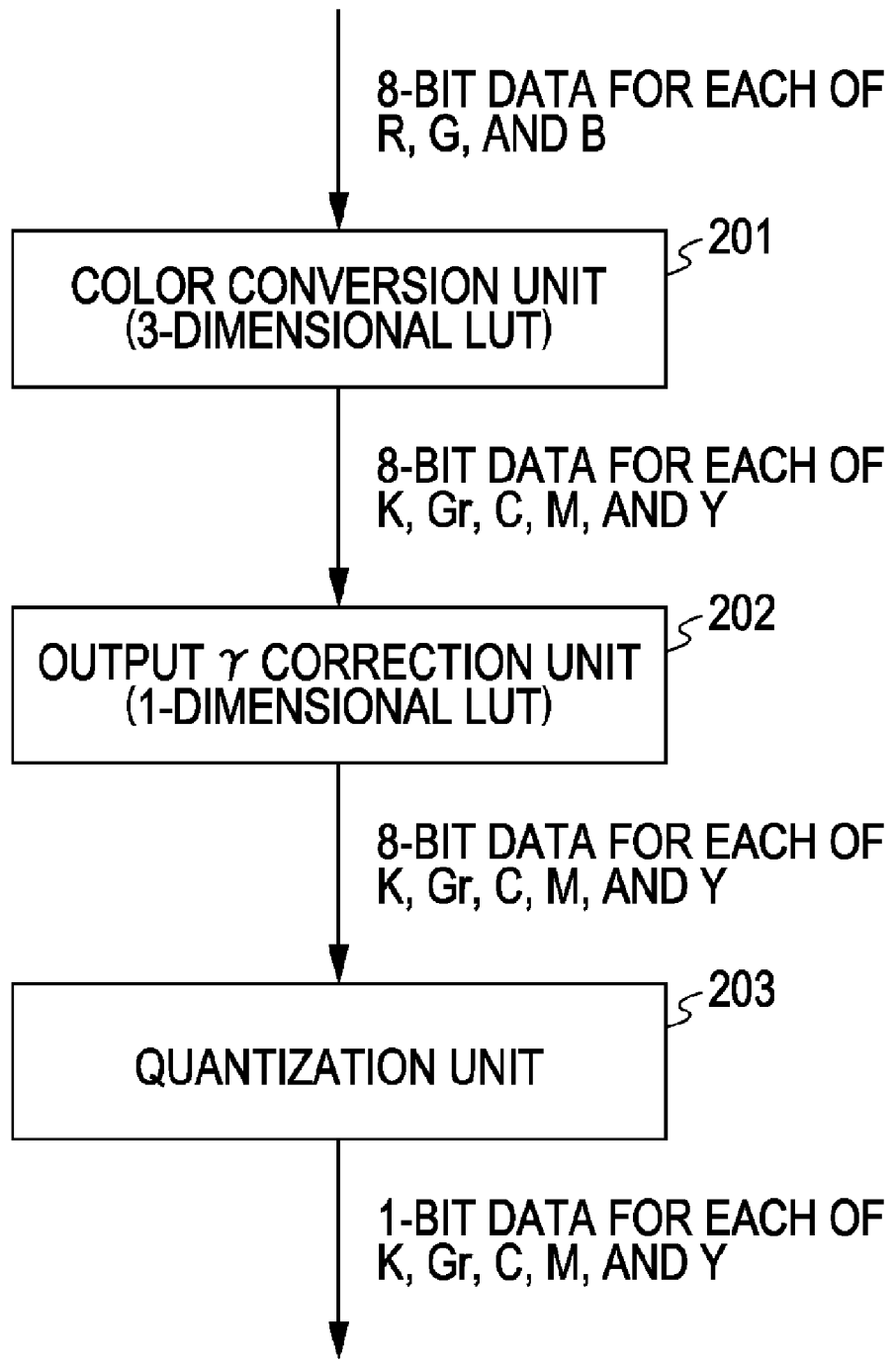
FIG. 4 is a block diagram illustrating an image data conversion process.

FIG. 4 is a block diagram illustrating the image data conversion processes performed by the CPU 102 according to the present embodiment. In the present embodiment, 8-bit (256 gray level) image data represented by red (R), green (G) and blue (B) luminance signals is converted into 1-bit data of C, M, Y, K, and Gr based on which the inkjet recording apparatus can record an image.

First, the 8-bit R, G, and B luminance signals are input to a color conversion unit 201 and converted into density signals of C, M, Y, K, and Gr. In this process, a 3-dimensional color conversion lookup table (LUT) is used. More specifically, the CPU 102 refers to the lookup table and determines density signal values of C, M, Y, K, and Gr corresponding to the combination of the input R, G, and B signal values. The lookup table has the density data only for particular discrete R, G, and B data, and therefore cannot be applied directly to all possible combinations of R, G, and B signal data in 256 gray levels. In the present embodiment, for combinations of input data that are not included in the lookup table, density data are determined by interpolation using the data included in the lookup table. The method of interpolation is well known in the art, and detailed descriptions thereof are thus omitted. The density signal values obtained by the color conversion unit 201 are expressed in 8 bits, similar to the input values, and are output as density data having 256 gray levels.

After the color conversion process is performed by the color conversion unit 201, the image data is subjected to a conversion process performed by an output γ correction unit 202. The output γ correction unit 202 performs a correction process for each ink color so that the optical density represented on a recording medium remains linear to the input density signal. In this process, 1-dimensional lookup tables prepared for the respective colors are referred to. The signals output from the output γ correction unit 202 are 8-bit density data, similar to the input data.

The 8-bit density data output from the output γ correction unit 202 is supplied to a quantization unit 203, where a quantization process is performed. In the inkjet recording apparatus used in the present embodiment, the amount of each ink droplet ejected from the recording head is 3 ng. The density at each pixel on the recording medium is represented by two levels depending on whether or not to eject an ink droplet in accordance with the kind of the ink. In a relatively large area including a plurality of pixels, the density is expressed macroscopically by the number of pixels recorded with ink droplets. This method of representing the density is generally called an area coverage modulation method. In recording apparatuses using the area coverage modulation method, the quantization process is required to convert multilevel data into 2-level data, as in the present embodiment. Some known quantization methods, such as an error diffusion method or a dithering method, can be applied in the present embodiment. The 1-bit image data for each color that is quantized by the quantization unit 203 is transferred to the inkjet recording apparatus.

The optimum conversion methods for the color conversion unit 201, the output γ correction unit 202, and the quantization unit 203 differ depending on the type of the recording medium, the type of the image to be recorded, etc. In particular, the lookup tables used by the color conversion unit 201 and the output γ correction unit 202 are generally prepared for each recording medium type.

Figure 5:
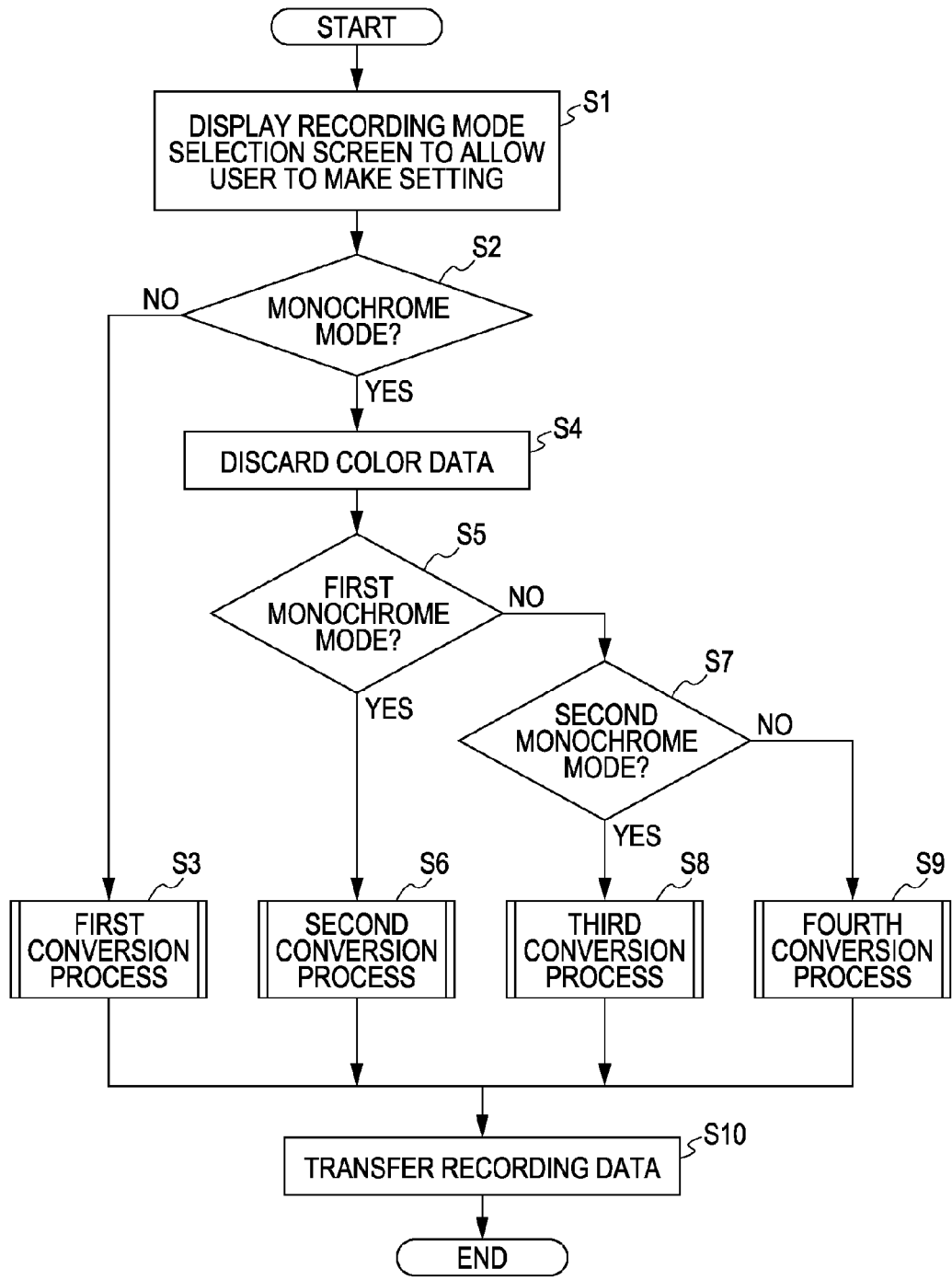
FIG. 5 is a flowchart of a process performed in response to a start recording command before a recording process is started by the recording apparatus.

FIG. 5 is a flowchart of a process performed in response to a start recording command input by a user before the recording operation is started by the recording apparatus. When the start recording command is input by the user, the CPU 102 displays a recording mode selection screen on the CRT 108 (step S1).

Figure 6:
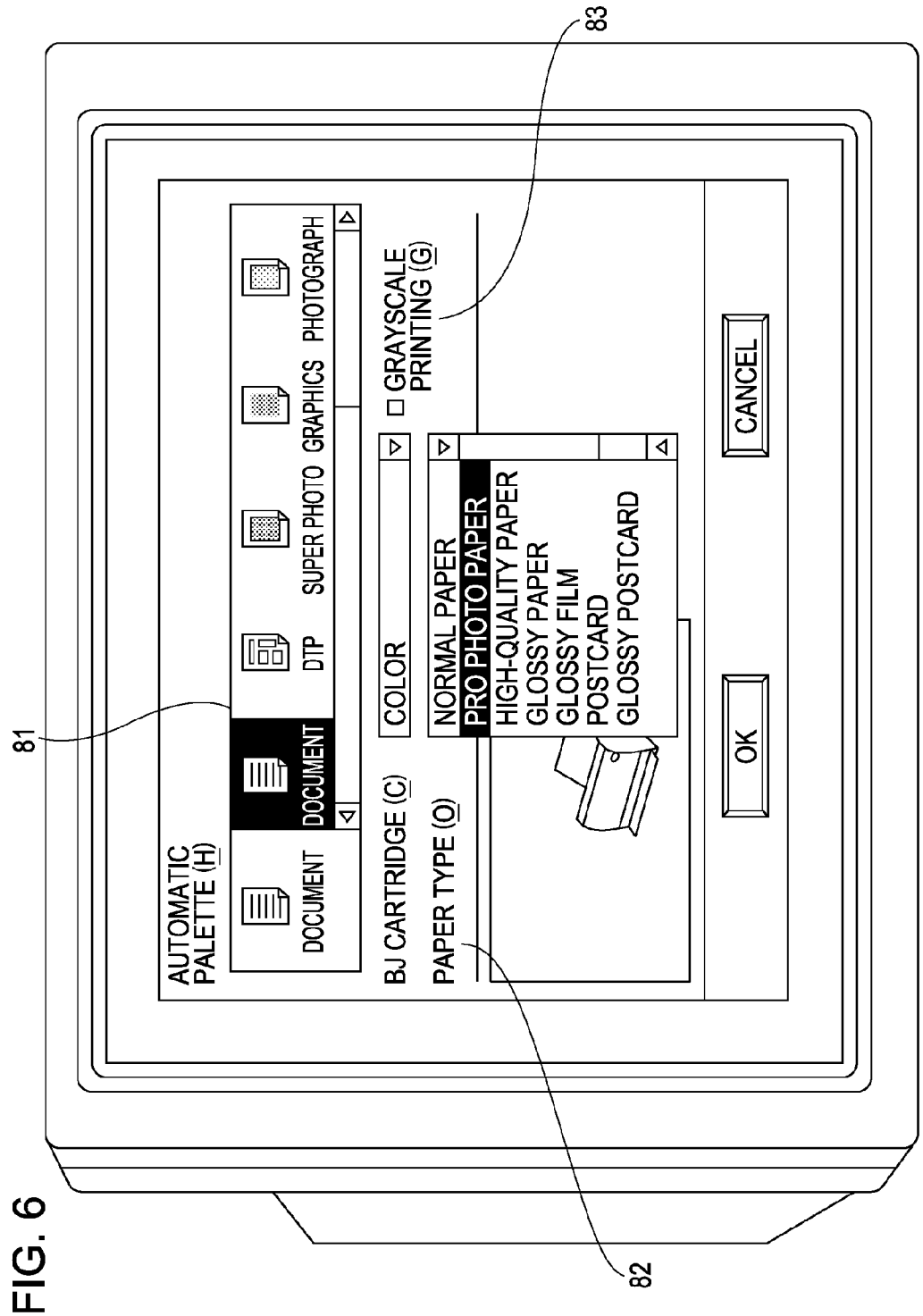
FIG. 6 is a diagram illustrating an example of a screen displayed on a CRT when a recording mode is set.

FIG. 6 shows an example of a screen displayed on the CRT 108 in step S1. In general, the inkjet recording apparatus is capable of recording on a plurality of types of recording media, and a suitable recording method is prepared for each recording medium type. The recording method is selected when a recording mode is set. The recording mode is generally set by the user by inputting several conditions while checking the screen shown in FIG. 6. In the present embodiment, the user sets the type of an image to be recorded (document, picture, etc.) with an automatic palette 81. In addition, the user sets the type of a recording medium on which the image is to be recorded through a paper type selection unit 82. The user also sets the monochrome mode, which is a mode for printing the desired image in grayscale, by checking a grayscale printing check box 83. In addition, although not shown in the figure, another automatic palette is provided to select one of a plurality of monochrome modes for different color tones, such as the warm tone and the cool tone. In the following descriptions, first, second, and third monochrome modes corresponding to the neutral tone, the cool tone, and the warm tone, respectively, are considered.

Referring again to FIG. 5, in step S2, it is determined whether or not one of the monochrome modes is set as the recording mode.

If it is determined that a monochrome mode is set in step S2, the process proceeds to step S4. If it is determined that a monochrome mode is not set in step S2, the process proceeds to step S3. In step S4, color information expressed in R, G, and B is discarded by a known method. More specifically, the R, G, and B image signals are converted into a gray tone (R=G=B) luminance signal. As an example of a conversion method, equations R'=G'=B'=L and L=0.3R+0.6G+0.1B can be used, where L is the luminance signal value of the achromatic color to be determined and R', G', and B' are luminance signals after the conversion. Accordingly, R, G, and B are converted into R', G', and B'.

Next, the process proceeds to step S5, where it is determined whether or not the monochrome mode set by the user in step S1 is the first monochrome mode. If the first monochrome mode is set, the process proceeds to step S6. If the first monochrome mode is not set, the process proceeds to step S7. In step S7, it is determined whether or not the monochrome mode set by the user in step S1 is the second monochrome mode. If the second monochrome mode is set, the process proceeds to step S8. If the second monochrome mode is not set, the process proceeds to step S9. In step S6, a second conversion process for the neutral tone is executed. In step S8, a third conversion process for the cool tone is executed. In step S9, a fourth conversion process for the warm tone is executed. The second, third, and fourth conversion processes each include the steps of image-data conversion described above with reference to FIG. 4.

The second, third, and fourth conversion processes will be described in detail below.

Figure 7:
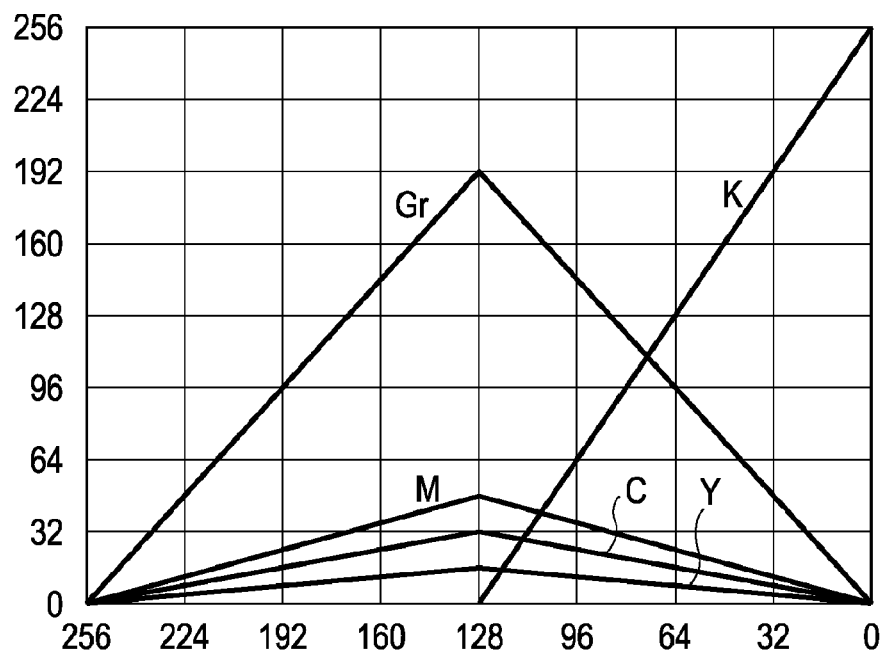
FIG. 7 is a graph of input luminance signal versus amount of recording of ink in a first monochrome mode (neutral tone) according to the embodiment.

The second conversion process is performed for the neutral tone, which functions as the reference for each recording medium. In the present embodiment, the achromatic materials, such as Gr and K, are dominantly used and the chromatic materials, such as C, M, and Y, are used for tone adjustment in accordance with the paper white. The state in which "the achromatic materials are dominantly used" means the state in which, of the total amount of recording of the inks used for recording all of the gray levels on the recording medium, the total amount of recording of the achromatic materials is larger than that of the chromatic materials. FIG. 7 shows the amounts of color inks used to represent the neutral tone. In FIG. 7, the horizontal axis represents the input luminance signal and the vertical axis represents the amount of recording. The input luminance signal is obtained by converting R, G, and B into R', G', and B' in step S4. The luminance signals R' G' and B' are subjected to the second conversion process, and the inks are ejected onto the recording medium by the amounts of recording shown in FIG. 7.

Figure 8:
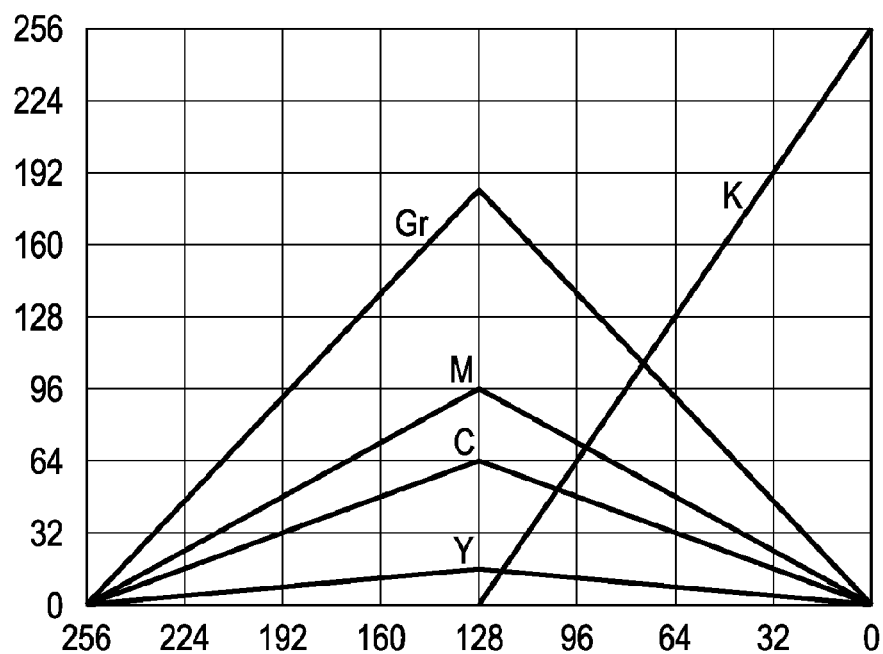
FIG. 8 is a graph of input luminance signal versus amount of recording of ink in a second monochrome mode (cool tone) according to the embodiment.
Figure 9:
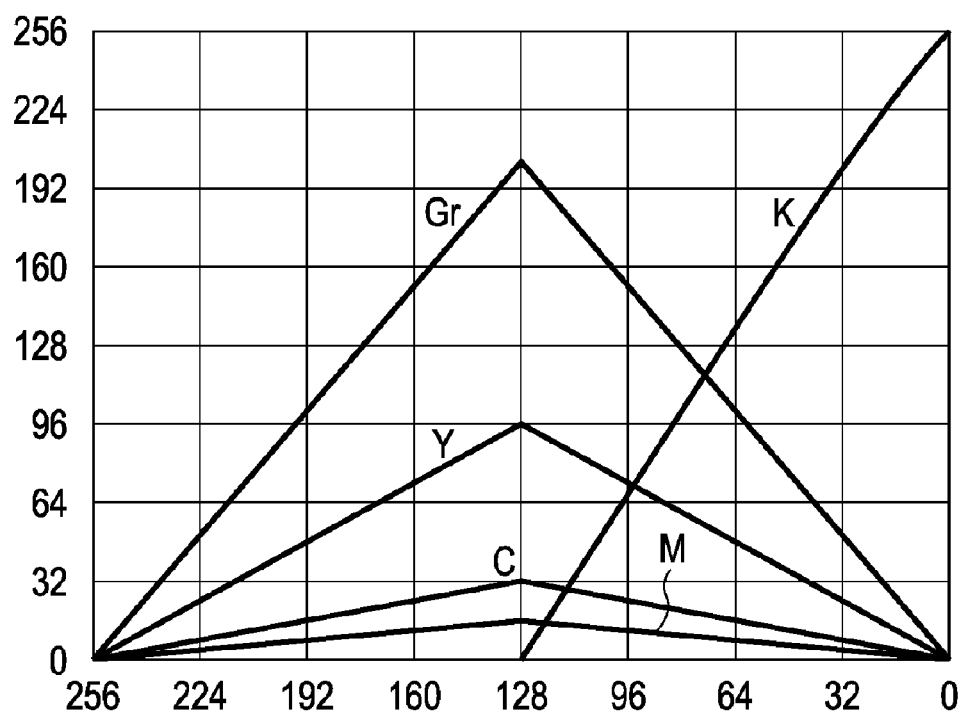
FIG. 9 is a graph of input luminance signal versus amount of recording of ink in a third monochrome mode (warm tone) according to the embodiment.

The third and fourth conversion processes are similar to the second conversion process. However, in the third and fourth conversion processes, differences in density and brightness from the result of the second conversion process are compensated for by adjusting the amounts of recording of the achromatic materials, such as Gr and K, in accordance with the amounts of recording of the chromatic materials, such as C, M, and Y. This will be described in more detail below with reference to FIGS. 7, 8, and 9. FIG. 8 shows the amounts of inks used to represent the cool tone, and FIG. 9 shows the amounts of inks are used to represent the warm tone. In FIGS. 8 and 9, the horizontal axis represents the input luminance signal and the vertical axis represents the amount of recording. In FIG. 8, in order to represent the cool tone, the amounts of recording of C and M are increased compared to those in the neutral tone. Therefore, in order to prevent the recording density on the recording medium from being increased, the amounts of recording of Gr and K, which are the achromatic materials, are reduced. As a result, the recording density of the cool tone is made equivalent to the recording density of the neutral tone.

In FIG. 9, in order to represent the warm tone, the amount of recording of Y is increased compared to that in the neutral tone. Therefore, in order to prevent the recording density on the recording medium from being reduced, the amounts of recording of Gr and K, which are the achromatic materials, are increased. As a result, the recording density of the warm tone is made equivalent to the recording density of the neutral tone.

After the data is subjected to one of the conversion processes in steps S6, S8, or S9, the process proceeds to step S10. In step 10, the data obtained as a result of the conversion process performed in step S6, S8, or S9 is transferred to the printer. Thus, a plurality of monochrome modes can be achieved with a suitable density in accordance with the setting made by the user.

If it is determined that the recording mode set in step S2 is not the monochrome mode, the process proceeds to step S3. In step S3, a first conversion process for conventional color printing is performed. Then, the process proceeds to step S10. The conversion process performed in step S3 is well known in the art, and explanations thereof are thus omitted.

A method for making the recording densities (or the recording brightnesses) of the neutral tone and the warm tone equivalent to each other will be described in detail below. First, an image is printed on the recording medium A in the neutral tone, and is then printed on the recording medium A in the warm tone. Next, the recording density (or the recording brightness) of the image printed in the neutral tone and that of the image printed in the warm tone are compared with each other. Then, the amounts of recording of the achromatic materials, such as Gr and K, of the LUT used by the color conversion unit 201 are adjusted so that the recording densities (or the recording brightnesses) become equivalent to each other. Here, the state in which the recording densities (or the recording brightnesses) are equivalent to each other refers to the state in which the difference in the luminance signal L is 1 or less, or the state in which there is no visually noticeable difference.

By the above-described method, densities of a plurality of monochrome modes, such as the cool tone and the warm tone, can be made equivalent to each other in a single recording medium.

In addition, according to the present embodiment, the recording densities (or the recording brightnesses) of images formed on a plurality of recording media A and B with different colors can also be made equivalent to each other. Also in this case, the amounts of recording of the achromatic materials, such as Gr and K, of the LUT used by the color conversion unit 201 are adjusted so as to make the recording densities (or the recording brightnesses) equivalent to each other. More specifically, the recording density (or the recording brightness) of the image printed on the recording medium A in a monochrome mode A is compared with that of the image printed on the recording medium B in the monochrome mode A. Then, the amounts of recording of the achromatic materials, such as Gr and K, are adjusted so that the recording densities (or the recording brightnesses) become equivalent to each other.

This method is effective in the case in which the desired color tone largely differs from the paper white. The reason for this will be described below. As described above, large amounts of chromatic inks must be used for correcting the color of the paper white. In addition, when a plurality of monochrome modes with different colors, such as the warm tone and the cool tone, are presented, the amounts of the chromatic inks to be used must be further increased. At this time, when the amounts of recording of the chromatic inks are increased without changing the amounts of recording of the achromatic inks, the recording density is changed. If the recording density is changed, problems occur in which, for example, certain tone differences cannot be presented.

In the present embodiment, the chromatic inks used for representing both the cool tone and the warm tone are the combination of C, M, and Y. However, the kinds of the chromatic inks are not limited to the above-mentioned combination. The number of kinds of the chromatic materials to be used can also be one or two.

In addition, in the present embodiment, C, M, and Y are used as the chromatic materials. However, other kinds of chromatic materials, such as light cyan (LC), light magenta (LM) can also be used. Alternatively, chromatic materials other than C, M, Y or K, such as red (R), green (G), and blue (B), can also be used. The kinds of the chromatic materials are not particularly limited as long as tone adjustment can be performed for the achromatic materials.

In addition, according to the present embodiment, the achromatic inks used in a plurality of monochrome modes, such as the neutral tone, the cool tone, and the warm tone are the combination of K and Gr. However, the kinds and combinations of the achromatic inks are not limited to those in the present embodiment. For example, only the K ink can be used as the achromatic material. Alternatively, two or more kinds of Gr inks having different densities can be used.

Although an example of density compensation is described in the present embodiment, the present invention is not limited to this depending on the ink characteristics. That is, depending on the ink characteristics, the density may increase when the amount of recording of Y is increased. In addition, the density may be reduced when the amount of recording of Gr is increased. In any case, it is assumed that the present invention is applied as long as the density or the brightness that is changed due to the addition of the added chromatic materials is compensated for by the achromatic materials.

In addition, in the present embodiment, the cool tone and the warm tone are described as the second monochrome mode and the third monochrome mode, respectively. However, the present invention is not limited to this as long as a plurality of monochrome modes with slightly different colors are provided. For example, additional monochrome modes, such as a fourth monochrome mode, a fifth monochrome mode, etc., can also be provided. The names of the monochrome modes are not limited to the warm tone and the cool tone, and can also be a cool tone, a sepia tone, etc.

In addition, although a plurality of conversion units are provided for a plurality of monochrome modes in the present embodiment, the method of the present invention is not limited to this. It is assumed that the present invention is applied as long as the inks are used by the method described above in the present embodiment to represent a plurality of monochrome modes.

As described above, according to the first embodiment, images can be recorded with the same recording density or the same recording brightness in both a first monochrome mode and a second monochrome mode for representing different color tones. In addition, images with the same recording density or the same recording brightness can be recorded on different kinds of recording media having different paper whites.

First Modification

In the above-described embodiment, the amount of recording per dot is constant for all of the achromatic materials and the chromatic materials. However, the present invention is not limited to this. For example, the amount of recording per dot of the chromatic materials can be different from that of the achromatic materials. Here, the achromatic materials and the chromatic materials are identical to the above-described inks.

Second Modification

In the first modification, the amount of recording per dot differs for each kind of ink. However, the present invention is not limited to this. For example, the size of each dot can be varied in accordance with the amounts of recording of the achromatic materials and the chromatic materials. Here, the achromatic materials and the chromatic materials are identical to the above-described inks.

Third Modification

In the above-described embodiment, the chromatic materials for tone adjustment are used over the entire density range. However, the present invention is not limited to this. For example, the chromatic materials for tone adjustment can be used only in a low-density region and not in a high-density region. In addition, the inks to be used can be changed in accordance with the density. For example, chromatic materials that form small dots or light color materials, such as LC and LM, can be used in a low-density region, and chromatic materials that form large dots or dark color materials can be used in a high-density region.

Other Embodiments

The inkjet recording system having the structure shown in FIG. 1 is described in the above-described embodiment. However, the present invention is not limited to this. The components shown in FIG. 3 may either be included in the host computer or in the inkjet recording apparatus. In addition, all of the components can be formed integrally as an image forming system.

In addition, in the above-described embodiment, all of the conversion processes described above with reference to FIG.

4 are performed by the CPU 102 included in the host computer 101. However, a part or all of the processes can be performed by the inkjet recording apparatus 107. In addition, the operation of inputting or setting the recording mode described above with reference FIG. 6 can also be performed by the inkjet recording apparatus.

The screen for setting the recording mode is also not limited to the screen shown in FIG. 6. In the screen shown in FIG. 6, the check box 83 is provided for selecting the grayscale printing. However, the structure in which, for example, the user can set the hue and saturation of the output image on the screen can also be provided. In such a case, it is determined that the grayscale mode is set if predetermined hue and saturation are set.

In the above-described embodiment, the inkjet recording apparatus capable of ejecting five kinds of color inks is described. However, the present invention can also be effectively applied to recording apparatuses other than inkjet recording apparatuses as long as color images can be formed using a plurality of color materials. However, the phenomenon of "color transition" is particularly significant in inkjet devices. Therefore, the present invention is particularly effective when applied to inkjet recording apparatuses. Various methods for ejecting ink from the inkjet recording head have been suggested. The present invention is particularly effective in the case in which extremely small ink droplets are ejected to form high-resolution images. Therefore, in the present invention, it is desirable that the recording head have a large number of densely disposed recording elements irrespective of the ejecting principle.

The present invention can also be carried out by supplying a storage medium (recording medium) in which software for executing the functions of the above-described embodiment is stored to a system or an apparatus and causing a computer (CPU or MPU) of the system or the apparatus to execute the software. In this case, the software read from the storage medium itself serves the functions of the above-described embodiment, and the storage medium that stores the software is within the scope of the present invention.

In addition to the execution of the software, the above-described functions can also be obtained by causing an operating system (OS) that operates on the computer to perform some or all of the processes in response to commands of the software.

The scope of the present invention also includes the case in which the software is stored in a memory of a function extension card or unit connected to a computer, and a CPU included in the card or unit performs some or all of the processes in response to commands of the software.

In the case in which the present invention is applied to a storage medium as described above, software corresponding to the above-described flowchart is stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image processing method for generating a density signal, corresponding to a chromatic material and an achromatic material to be used for forming an image, from a luminance signal,
wherein a total amount of recording of the chromatic material is smaller than a total amount of recording of the achromatic material, and a plurality of monochrome modes are provided, the total amount of recording of the chromatic material being different for each of the monochrome modes, and
wherein the image processing method comprises:
a setting step of setting a monochrome mode for forming an image in monochrome from the plurality of monochrome modes; and
a generating step of generating a density signal, corresponding to a chromatic material and an achromatic material, from a luminance signal of the image, the generating step being a process to be executed if the monochrome mode is set,
wherein, in the generating step, the density signal is generated from the luminance signal, by using a look-up table in which an amount of a density signal corresponding to the achromatic material is adjusted, such that for identical luminance signals, a recording density of an image if recording is performed by using a first monochrome mode, included in the plurality of monochrome modes, and a recording density of an image if recording is performed by using a second monochrome mode, included in the plurality of monochrome modes, are equivalent to each other.

2. The image processing method according to claim 1, wherein, in the generating step, it is determined that the recording density or the recording brightness of the image recorded in the first monochrome mode and the recording density or the recording brightness of the image recorded in the second monochrome mode are equivalent to each other if a difference between a luminance of the image recorded in the first monochrome mode and a luminance of the image recorded in the second monochrome mode is equal to or less than 1.

3. The image processing method according to claim 1, wherein the plurality of monochrome modes include at least any one of a neutral black tone mode, a cold black tone mode, and a warm black tone mode.

4. An image processing apparatus that generates a density signal, corresponding to a chromatic material and an achromatic material, from a luminance signal,
wherein a total amount of recording of the chromatic material is smaller than a total amount of recording of the achromatic material, and a plurality of monochrome modes are provided, the total amount of recording of the chromatic material being different for each of the monochrome modes, and
wherein the image processing apparatus comprises:
a setting unit configured to set a monochrome mode for forming an image in monochrome from the plurality of monochrome modes; and
a generation unit configured to generate a density signal, corresponding to a chromatic material and an achromatic material, from a luminance signal of the image, the generation being a process to be executed if the monochrome mode is set,
wherein the generation unit generates the density signal from the luminance signal, by using a look-up table in which an amount of a density signal corresponding to the achromatic material is adjusted, such that for identical luminance signals, a recording density of an image if recording is performed by using a first monochrome mode, included in the plurality of monochrome modes, and a recording density of an image if recording is performed by using a second monochrome mode, included in the plurality of monochrome modes, are equivalent to each other.

5. The image processing method according to claim 4, wherein, in the generation unit, it is determined that the recording density or the recording brightness of the image recorded in the first monochrome mode and the recording density or the recording brightness of the image recorded in the second monochrome mode are equivalent to each other if a difference between a luminance of the image recorded in the first monochrome mode and a luminance of the image recorded in the second monochrome mode is equal to or less than 1.

6. An image processing apparatus according to claim 4, wherein the plurality of monochrome modes include at least any one of a neutral black tone mode, a cold black tone mode, and a warm black tone mode.

7. A non-transitory computer-readable storage medium, having a plurality of monochrome modes whose total amounts of the chromatic material is different from each other, that stores a control program for causing a computer to execute an image processing method for generating a density signal, corresponding to a chromatic material and an achromatic material, from a luminance signal,
   wherein a total amount of recording of the chromatic material is less than a total amount of recording of the achromatic material, and
   wherein the image processing method comprises:
      a setting step of setting a monochrome mode for forming an image in monochrome from the plurality of monochrome modes; and
      a generating step of generating a density signal, corresponding to a chromatic material and an achromatic material, from a luminance signal of the image, the generating step being a process to be executed if the monochrome mode is set,
   wherein, in the generating step, the density signal is generated from the luminance signal, by using a look-up table in which an amount of a density signal corresponding to the achromatic material is adjusted, such that for identical luminance signals, a recording density of an image if recording is performed by using a first monochrome mode, included in the plurality of monochrome modes, and a recording density of an image if recording is performed by using a second monochrome mode, included in the plurality of monochrome modes, are equivalent to each other.

* * * * *